United States Patent [19]
Julstrom

[11] Patent Number: 4,658,425
[45] Date of Patent: Apr. 14, 1987

[54] MICROPHONE ACTUATION CONTROL SYSTEM SUITABLE FOR TELECONFERENCE SYSTEMS

[75] Inventor: Stephen D. Julstrom, Chicago, Ill.

[73] Assignee: Shure Brothers, Inc., Evanston, Ill.

[21] Appl. No.: 881,523

[22] Filed: Jun. 30, 1986

Related U.S. Application Data

[63] Continuation of Ser. No. 725,302, Apr. 19, 1985, abandoned.

[51] Int. Cl.[4] .............................................. H04R 3/00
[52] U.S. Cl. ...................................... 381/81; 381/92; 381/111; 381/107; 379/206
[58] Field of Search ................. 381/81, 92, 95, 96, 381/103, 107, 108, 111, 122; 179/18 BC

[56] References Cited

U.S. PATENT DOCUMENTS

| | | | |
|---|---|---|---|
| 3,751,602 | 8/1973 | Breeden | 381/81 |
| 3,755,625 | 8/1973 | Maston | 381/81 |
| 3,814,856 | 6/1974 | Dugan | 179/18 BC |
| 4,090,032 | 5/1978 | Schrader | 381/81 |
| 4,099,025 | 7/1978 | Kahn | 381/81 |
| 4,237,339 | 12/1980 | Bunting et al. | 381/81 |
| 4,434,507 | 2/1984 | Thomas | 381/92 |
| 4,485,484 | 11/1984 | Flanagan | 381/92 |
| 4,489,442 | 12/1984 | Anderson | 381/81 |

OTHER PUBLICATIONS

S. Julstrom and T. Tichy, "Direction-Sensitive Gating . . .", *J. Audio Eng. Soc.*, vol. 32, No. 7/8, Jul. 1984, pp. 490–506.

*Primary Examiner*—Gene Z. Rubinson
*Assistant Examiner*—L. C. Schroeder
*Attorney, Agent, or Firm*—Allegretti, Newitt, Witcoff & McAndrews, Ltd.

[57] ABSTRACT

A microphone and loudspeaker arrangement for use in a teleconference system, wherein a plurality of microphones are held in a fixed relationship to a loudspeaker. The microphones are independently gated ON in response to (1) speech picked up by the microphone, (2) a loudspeaker signal driving the loudspeaker and (3) an electrical signal related to the microphone signals of the other associated microphones. A noise adapting threshold circuit generates a voltage level representative of background noise which is compared with the microphone signal of a respective microphone for determining whether the microphone is receiving speech. A decisional circuitry monitors the microphone signal of the associated microphone with respect to a MAX bus which carries microphone signals representative of the level of microphone signals at the other microphones. The decisional circuitry generates a signal indicating that the associated microphone is the first loudest microphone signal.

21 Claims, 14 Drawing Figures

MICROPHONE ACTUATION CONTROL SYSTEM SUITABLE FOR TELECONFERENCE SYSTEMS

This application is a continuation of application Ser. No. 725,302, filed Apr. 19, 1985, now abandoned.

RELATED PATENT APPLICATIONS

The following application relates to U.S. patent application Ser. No. 06/597,734, filed Apr. 6, 1984, entitled "Teleconference System" by Stephen D. Julstrom, which application is owned by the same entity as the present application.

BACKGROUND OF THE INVENTION

The present invention relates to an automatic microphone control suited for use in sound reinforcement, recording, broadcast, teleconference and other applications.

Because of the number of participants involved or the number of locations needing sound pickup, multiple microphones are often used in applications such as churches, courtrooms, broadcasting studios, legislative chambers, and conference rooms, and in particular, in teleconferencing. The outputs of these microphones are usually combined in a mixer to feed a sound reinforcement system, a recording device, or a transmission link to a remote location. If a conventional mixer is used with multiple microphones, the room noise and reverberation pickup is increased as compared to a single microphone; also, the tendency for howlback is increased, even though typically only one or two microphones are receiving useful acoustic input (speech) at any given time. This is discussed extensively in "Direction-Sensitive Gating: A New Approach to Automatic Mixing" by Stephen Julstrom and Thomas Tichy, JAES, Vol. 32, Nos. 7/8, 1984, July/August.

Automatic mixers have more recently been employed to "gate" ON (pass to the mixer output) only signals from microphones receiving useful acoustic input. The relative effectiveness of these mixers is primarily a function of the means used to decide when a microphone should be gated ON. A microphone should gate ON quickly and independently in response to valid speech input over a wide dynamic range. Yet it should not respond to background room noise, nor to talkers who would be better picked up by another microphone. Additionally, for proper operation of many teleconference systems, including the system of the aforementioned related application, the room loudspeaker providing audio from the remote location should not trigger microphone gating.

A gating method dependent on a representation of the microphone output level exceeding a fixed threshold level satisfies none of these criteria. Various prior art references suggest different gating methods.

For example, in Dugan (U.S. Pat. No. 3,814,856), the threshold level for each microphone's gating tracks an estimate of the background room noise made from a distant sample taken from a separate noise-sampling microphone or from the average of all microphones in the system. This is done to improve the gating sensitivity while avoiding response to room noise.

In Breeden (U.S. Pat. No. 3,751,602), a simple microphone is, in essence, gated for use in a speakerphone (a simple teleconference system). Here, the noise reference is taken from the single microphone with its level representation processed through a very slow attack, rapid decay circuit. Additional circuitry inhibits microphone gating for loudspeaker sound in most room acoustic environments.

In Maston (U.S. Pat. No. 3,755,625), one and only one of a plurality of microphones is gated ON at any time. To gate ON (and thus gate OFF the already ON microphone), a microphone's level must exceed a fixed threshold and exceed the level of the already ON microphone by a preselected amount, such as 3 dB.

In Kahn (U.S. Pat. No. 4,099,025), to prevent gating a plurality of microphones for a single source, during the time when a microphone's level exceeds a threshold, triggering of all other microphones is prevented for the duration plus a short additional time roughly corresponding to the transit time for the sound to travel to the farthest microphone in the system.

In Schrader (U.S. Pat. No. 4,090,032), a preselectable, fixed threshold is overridden as soon as at least one microphone's level exceeds it and is gated ON. The threshold then varies between a high maximum level and approximately the level of the gated ON microphone with the highest level. Gating ON of more than a few microphones simultaneously, even for multiple sound sources, is strongly inhibited.

In Anderson et al. (U.S. Pat. No. 4,489,442, owned by the same entity as the present application), each "microphone" actually consists of an array of typically two unidirectional microphones mounted back-to-back in a common housing whose output levels are compared. When the level of the "front" microphone exceeds the level of the "rear" microphone by a predetermined amount, typically 9.54 dB (indicating the sound source is within an "acceptance angle"), gating is triggered for the front microphone's signal.

This Anderson arrangement (which also forms part of the preferred embodiment of the related Julstrom application previously referenced), has an effective gating threshold which inherently tracks at about 5 dB above the room noise level at the microphone's location. The Anderson arrangement results in direction-sensitive gating which limits the number of microphones which gate ON for individual sound sources while not causing the gating of any microphone to inhibit the desired gating of any other microphone for other sound sources. Also, the Anderson arrangement allows positioning a teleconference system loudspeaker in such a way that it will not trigger gating of any microphone and will not significantly inhibit desired gating for local talkers.

However, the operating principle of Anderson requires some care in microphone and loudspeaker placement. Anderson also allows a single sound source to trigger gating in a plurality of microphones with overlapping acceptance angles. Anderson requires typically two high-quality matched transducer elements for each "microphone" even though only one of the pair is ever heard. Most significantly, Anderson can have proper gating inhibited by acoustically reflective objects close to the rear of the microphone or by placement of the microphone too far away from the sound source in relation to the reverberant field of the room, thus preventing the microphone from accurately assessing the direction of the sound source.

The sound which a microphone "hears" in a room can be simply described as consisting of two parts: a direct sound which decreases in level 6 dB each time the distance from the source is doubled; and a reverberant field, coming from all directions, which stays substantially uniform in level throughout the room as it decays away.

The direction-sensitive gating technique works well unless the microphone is so far from the sound source that the reverberant field dominates in the microphone's sound pickup. In larger rooms, this will not occur until the microphone is five feet or more away from a talker. However, at this distance, its pickup would be hollow, "barrelly" and perhaps unintelligible. In smaller rooms, such as offices and many conference rooms, the reverberant field may dominate at distances of two feet or less, preventing proper gating using the direction-sensitive microphone technique at convenient talker-to-microphone distances. However, in contrast to the larger rooms, in many of these smaller rooms, the sound pickup quality, even if predominantly reverberant, is still intelligible and subjectively acceptable due to the quick reverberant decay time. The microphones would be usable if they gated properly.

None of the prior art disclosed in the above cited patents fully addresses the goal of attaining maximum gating sensitivity in the presence of varying background room noise, preventing a plurality of microphones from gating ON for a single talker, allowing with little mutual inhibition a plurality of talkers to simultaneously gate ON a plurality of microphones; and doing all this even when operating in a near totally reverberant (i.e., small room) acoustic environment. Additionally, sound from a teleconferencing system loudspeaker must not gate microphones ON, yet desired gating for simultaneous local speech should not be significantly inhibited, again in a very reverberant environment.

It is therefore an object of the present invention to provide an automatic microphone gating method which maximizes sensitivity to speech while avoiding sensitivity to varying background room noises.

It is yet another object of the present invention to allow only the single most appropriate microphone in a system to gate ON for a single talker.

It is another object of the present invention to allow a plurality of talkers to simultaneously gate ON a plurality of microphones, with minimal mutual inhibition of gating.

It is another object of the present invention to prevent teleconference system loudspeaker sound from gating microphones ON, with minimal inhibition of desired microphone gating for locally originating speech.

It is another object of the present invention to enable all the other objects to be met even in near totally reverberant, smaller room acoustic environments.

It is another object of the present invention to allow the creation of "dead zones" in a room where sound sources do not trigger any microphone gating.

It is another object of the present invention to provide a variation whereby microphone gating information can be used to control other functions, such as automatic video camera switching.

It is another object of the present invention to link a gating method described herein with an automatic gain adjusting means to maintain constant reverberant field pickup as the number of widely spaced microphones gated ON varies above zero.

It is another object of the present invention to provide a variation whereby an automatic gain adjusting means maintains constant reverberant field pickup as the number of very closely spaced directional microphones gated ON varies above zero.

It is another object of the present invention to use a gating method described herein in the teleconference system of the previously referenced related Julstrom application yielding the benefits described therein.

It is still another object of the present invention to employ such a teleconference system in a combined loudspeaker-microphone arrangement which optimally exploits the characteristics of the gating method, is easy and foolproof to set up, provides improved sound pickup and production through optimized acoustical and electrical design, works in almost any acoustical environment, and is easily expandable.

SUMMARY OF THE INVENTION

These and other objects are achieved in a preferred embodiment of the invention which uses processing circuitry which responds to accurate, rapidly varying DC level representations of the frequency equalized output of each microphone and, in a teleconference embodiment uses the electrical drive signal to the loudspeaker, similarly equalized.

Each microphone circuit block of the preferred embodiment further processes its DC level representation through a very slow attach, immediate decay circuitry, yielding a noise adaptive threshold (NAT). This threshold adjusts to the background noise level present during brief pauses in speech, but does not particularly respond to speech waveforms. To satisfy the NAT criterion and potentially initiate gating, a microphone's DC level representation must exceed its NAT by an amount, established at 6 dB, just sufficient to guard against false triggering due to random background noise fluctuations.

This enables a high gating sensitivity (low threshold) to speech, even in the presence of room noise, which is further improved by the use of directional microphones. In the teleconference system of the preferred embodiment, the microphones reject room noise pickup typically 5 to 7 dB as compared to direct speech pickup. Thus, direct speech will typically gate ON a microphone at about the measured room noise level (as measured by a standard omnidirectional noise measurement device).

The NAT gating criterion also works well for microphones located in the predominantly reverberant field of a talker, at least over the range of reverberation buildup and decay rates found in acoustically poor, small to medium-sized conference rooms, albeit without the extra sensitivity boost afforded by directional microphones. (The microphones would not be used in the predominantly reverberant field of very large rooms with very long rverberation buildup and decay rates which might cause gating problems, since the sound pickup quality of even a directional microphone used at the implied distance from the source in this environment would be unusable).

To prevent a plurality of microphones from gating ON for a single talker, a second criterion (MAX bus) is required to be satisfied in addition to the NAT criterion before gating of a microphone is triggered. The MAX bus is a single interconnection between the system's individual microphone circuit blocks which maintains a varying DC level equal to the maximum of the varying DC level representation of each of the gated ON microphones and the level representations reduced by a fixed amount, established at 6 dB, of each of the gated OFF microphones. To satisfy the MAX bus criterion, a microphone's circuit block must, at least momentarily, be "holding up" (providing the maximum voltage to) the MAX bus.

Only when the MAX bus and NAT criteria are simultaneously satisfied for a microphone will the microphone be gated ON. This simultaneously results in a trigger signal which is extended by a retriggerable one-shot for a "hold time", established at 0.4 seconds, sufficient to bridge gaps in triggering and pauses between words. A downstream circuit controls the attack and decay rates of the audio signal switching to improve the subjective effect of the gating. These trigger extending and switching rate controlling circuits are substantially identical to those disclosed in the previously referenced patent of Anderson et al.

While not necessary in many instances, in the preferred embodiment all microphones are identical and operated at the same relative gains, differing only in their orientation and positioning relative to the various sound sources. A talker's speech reaches the microphone closest to him (the one best suited to picking up his voice) before any other microphone and gates it ON. (If the microphones were not identical, were operated at differing relative gains, or were positioned either poorly or very close together, their relative levels would become more important in addition to the relative arrival times, but even then a microphone well-suited to picking up the talker's voice would gate ON.)

The gated ON microphone immediately gains a 6 dB advantage over the gated OFF microphones on the MAX bus, effectively preventing other microphones from gating ON for that talker. The 6 dB advantage, in combination with the filter time constants and characteristics of the DC level representation circuits, prevents secondary microphone gating (for that talker) even for impulsive sounds or sounds that terminate abruptly (later at more distant microphones) and for reverberant decays of sounds, which reach all microphones at approximately equal levels. The 6 dB advantage to the ON microphone insures that the reverberant sound will not trigger gating of an OFF microphone. The filter time constants, established at 11 milliseconds, are barely slow enough to reliably prevent abruptly terminating sounds from triggering more distant microphones.

Thus, a single talker gates ON only one microphone, but a plurality of talkers speaking normally can reliably gate ON a plurality of microphones, if that is what is required to optimally pick up the talkers' voices. The use of precision full wave rectification proceeded by attenuation of low frequencies in obtaining the DC level representations of the microphone outputs allows the rapid 11 millisecond filter time constants. Normal speech patterns have frequent peaks, dips, dropouts, and pauses which are accurately represented in these rapidly varying DC levels. Since a plurality of talkers cannot synchronize these variations, there are frequent opportunities for each talker's closest microphone's circuit to momentarily "hold up" the MAX bus, resulting in a gating trigger which is extended as described above. The rapid DC level variations from each voice are normally much greater than the differences in average level between individual voices. This allows a softer talker microphone circuit to hold up the MAX bus to gate ON his microphone even though a louder talker is simultaneously talking ON another microphone. This is not significantly altered by the 6 dB advantage given already ON microphones on the MAX bus, which is small in proportion to the microphone level variations.

The 6 dB advantage does mean, however, that a talker will tend to keep gated ON an already ON microphone if he is only slightly closer to a gated OFF microphone.

To prevent sound from a teleconference loudspeaker from gating ON a microphone, a "speaker inhibit signal" is generated. The speaker inhibit signal is a rapidly varying DC level representation (substantially identical in character to those already discussed) of the electrical drive signal to the loudspeaker. This is scaled to represent approximately the worst case (highest) DC level representation expected from the microphones due to loudspeaker sound.

A speaker inhibit signal such as this could be used in a direct microphone level comparison or applied to the MAX bus to prevent microphone gating from direct loudspeaker to microphone sound. This would have minimal effect on desired microphone gating for simultaneous local speech (necessary to interrupt the distant talker) due to the rapid time constants involved, as just discussed in connection with multiple microphone gating. However, in most practical rooms, sufficient energy would be available in the reverberant decay of the loudspeaker sound to trigger microphone gating after the speaker inhibit signal was gone, if applied in this manner. The decay time of the speaker inhibit signal would need to be lengthened to several tenths of a second or more (conceivably much more to allow for particularly poor rooms) to prevent false microphone gating. This would remove the rapid level variation from the signal and make interruption of an incoming talker by gating ON a microphone very difficult.

Instead, the speaker inhibit signal, with its rapid level variations, is applied in a specific manner to the NAT of each microphone. Each microphone's NAT can be "held up" (with the same meaning as used in connection with the MAX bus) by either its own action or the speaker inhibit signal, whichever is greater. The speaker inhibit signal is scaled appropriately to prevent microphone gating due to the worst case loudspeaker to microphone coupling, and rapid time constants are maintained to minimize inhibition of desired microphone gating for excellent interruptability.

The NAT level is not, however, just the maximum of the speaker inhibit and original NAT levels. When a speaker inhibit signal decays down, the modified NAT level is not what it would have been before the application of the speaker inhibit signal. The modified NAT follows the decaying speaker inhibit level until it reaches the level representation of the microphone output, and from there follows the latter level in normal NAT action. In the absence of local speech, the microphone acoustic input immediately following the decaying away of the speaker inhibit signal is the loudspeaker sound's reverberant decay. This does not trigger microphone gating since the 6 dB microphone level-to-NAT level criterion is not satisfied, even for uneven reverberant decays. By inherently tracking the actual reverberant decay of a room, the speaker inhibit function done in this manner precludes the need for designed-in-safety margins based on the worst and most unpredictable room acoustics to be encountered, and enables a sensitive local interruption capability to be maintained throughout the range of usable room acoustics. The speaker inhibit function may be beneficially used with a plurality of microphones in conjunction with the NAT and MAX bus, or with a single microphone in conjunction with the NAT without the MAX bus circuitry, as described hereinafter.

While the microphone gating scheme disclosed herein may be used with a variety of additional circuitry to complete a teleconference system, its characteristics are most advantageously exploited when used as part of a system such as disclosed in the previously referenced related Julstrom application. This enables the benefits of that system, including total system gain and feedback control with sensitive, fast, conversationally-oriented send/receive direction switching, to be achieved in smaller, acoustically poorer rooms and with less restrictive setup requirements.

In the preferred embodiment disclosed herein, a small upward-facing loudspeaker is combined in a common low-profile housing, or module, with three outward-facing surface-mounted directional microphones evenly spaced around the circumference. When used in this manner, the acoustical design can be optimized to yield smooth, wide-range speech pickup and reproduction without the frequency response aberrations commonly encountered when acoustic transducers are used in the vicinity of reflective surfaces. The loudspeaker distributes its sound uniformly to all conference participants around the module. In combination with the disclosed gating method, the microphones pick up speech substantially uniformly around the module with a significant reduction in room noise and reverberation pickup as compared to a single omnidirectional microphone. In addition, the directional microhpones are placed around the loudspeaker such as to maximally reject the direct loudspeaker sound. Even though allowance has to be made for strongly reflected loudspeaker sound from closely placed objects, this still allows some reduction in the speaker inhibit signal level and the feedback controlling suppression setting (described in the related Julstrom application) as compared to what would otherwise be required with such close transducer spacing.

The loudspeaker-microphone modules can be used singly or "daisy-chained" to give better acoustic coverage of longer tables or a plurality of tables. Interconnection between modules is made through a single multi-conductor cable which, among other things, links the gated microphone outputs, the MAX bus, and the loudspeaker power amplifier drive signals. The single microphone closest to the talker still gates ON for his speech.

At the user's discretion, a module may be "muted", which prevents the audio signals of its microphones from gating ON, but allows its circuitry to act normally in MAX bus interactions, as if the microphones were gating. This creates a "dead zone" around the muted module where speech and other unwanted sounds (paper rustling, etc.) cannot triggeer microphone gating and, therefore, cannot interrupt a teleconference. This muting action can, of course, be applied to single microphones also.

As a variation, applicable to teleconferencing or more general use, instead of spacing microphones apart, a plurality of directional microphones may be arrayed very close to each other such that, over a majority of the audio frequency range, sound waves from various directions arrive at the microphones essentially in the same phase. Under this condition, when various combinations of microphones in the array gate ON, new polar directional patterns are formed. In essence, the array forms a single microphone whose polar directional pattern and orientation automatically adjusts to optimize the pickup of the talkers around it.

DESCRIPTION OF THE PREFERRED EMBODIMENT

Figure 1:
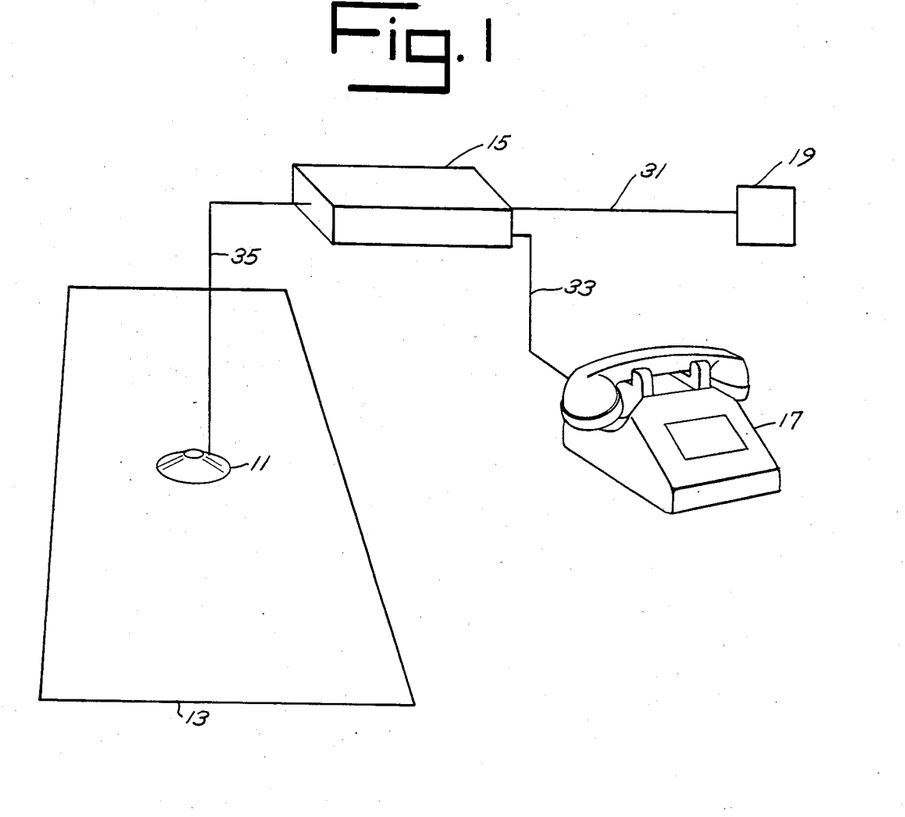
FIG. 1 is a diagrammatic and perspective view of a teleconference system for use with the present invention.

Referring to FIG. 1, an embodiment of a teleconference system is shown. The system includes a microphone/loudspeaker until 11 approximately one foot in diameter which is positioned in the center of a conference table 13. The microphone/loudspeaker unit 11 is connected to a control unit 15 of the system by a cable 35 which may pass through holes drilled in the table or may rest on the table top.

Control unit 15 is interconnected to a telephone line wall jack 19 by means of conventional telephone wire 31 for conventional "two-wire" connections. A telephone 17 is also connected to control unit 15 by telephone wire 33. The user is able to automatically connect either telephone 17 or microphone/loudspeaker unit 11 and associated circuitry in control unit 15 to telephone line wall jack 19.

Although shown connected to a two-wire link (combined send/receive path), the system may also be used with a four-wire link (separate send and receive paths) as described in the cited Julstrom application. The four-wire link may be hard-wired or may be a radio or satellite link, which may include time delay. The radio link may be that of a mobile telephone system, although a more appropriate physical arrangement of the microphone(s) and loudspeaker than that to be described hereinafter would be used.

Figure 2:
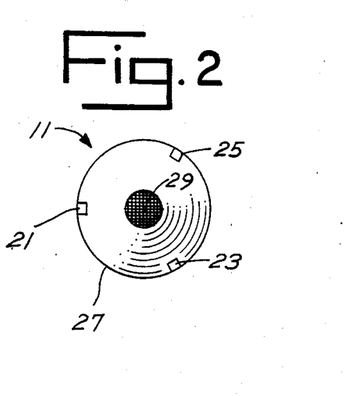
FIG. 2 is a top view of a preferred embodiment of a microphone and loudspeaker arrangement of the present invention.
Figure 3:
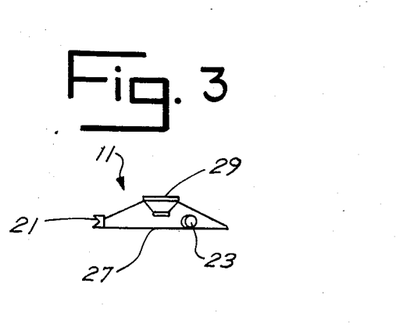
FIG. 3 is a side view of the loudspeaker and microphone arrangement of FIG. 2.

As shown in FIGS. 2 and 3, microphone/loudspeaker unit 11 includes three outwardly facing unidirectional (cardioid) microphones 21, 23 and 25 which are equally spaced about the circumference of a base 27 of unit 11. The base 27 is of a flattened, generally conical shape as shown. A loudspeaker 29 is positioned at the acoustic null of the three microphones 21–25 and faces upwardly in direction being flushly mounted in base 27, as shown. Base 27 preferably rests on the tabletop of conference table 13.

With such a mounting, microphones 21, 23 and 25 operate very near the surface with minimal acoustical interference from the base 27. Also, the loudspeaker 29 operates essentially as if flush-mounted in a large, flat surface. As is described in the literature, both microphones and loudspeaker may then have smooth, uniform frequency responses throughout the voice range without the usual deleterious effects of table surface reflections. In addition, the directivity indices of both microphones and loudspeaker are increased by an amount approaching 3.0 dB (as compared to free space), increasing clarity of sound pickup and production. Horizontal dispersion of the loudspeaker sound is achieved primarily through its small size (approximately 2 inch diameter cone), minimizing "beaming".

Each microphone 21-25 reduces undesired sound pickup (room noise, reverberation and loudspeaker sound) by being maintained in a normally OFF condition until needed. A microphone is automatically gated ON only when it is the closest microphone to a speech-like sound source other than the loudspeaker. A microphone will not gate ON for background room noise or for loudspeaker sound.

In the absence of local speech, the microphones are gated OFF and totally break the acoustic coupling path from loudspeaker to microphone. No echo of loudspeaker sound will be returned to the far end of the communication link. The microphones will turn ON quickly and reliably in response to speech, without chopping syllables or words. Through their directionality in conjunction with the acoustic arrangement of speaker and microphones as previously described, the microphones minimize acoustic coupling from the loudspeaker and pick up of room noise and reverberation while gated ON.

Several units 11 may be used along the conference table 13. Two or more units 11 may be electrically connected in tandem, as discussed above and further described hereinafter.

Figure 4:
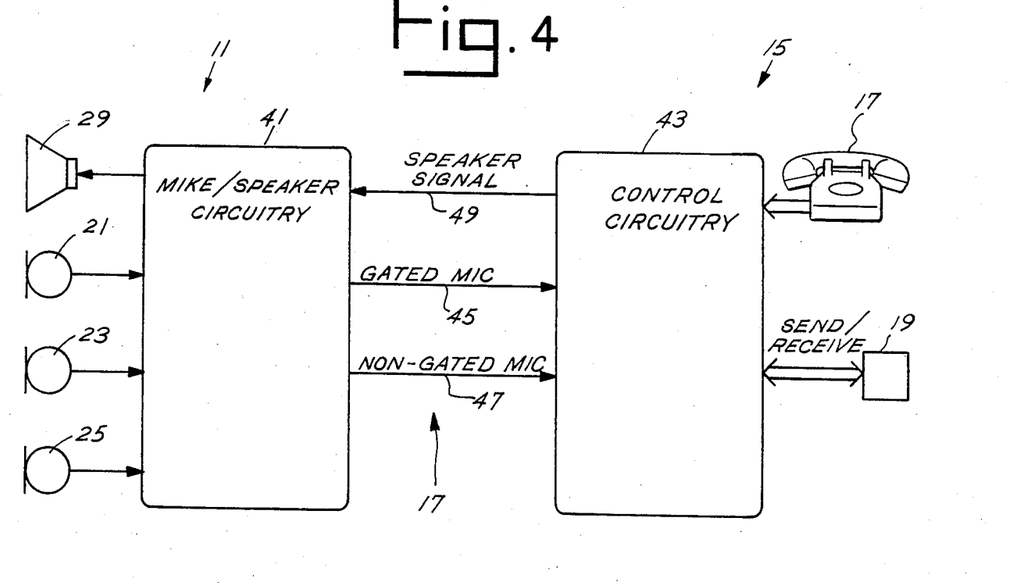
FIG. 4 is a block diagram of the teleconference system of FIG. 1.

Referring to FIG. 4, microphone/loudspeaker unit 11 houses mike/speaker circuitry 41, while control unit 15 houses control circuitry 43. Mike/speaker circuitry 41 receives signals from microphones 21-25 and responsively generates gated and non-gated microphones signals along respective conductors 45, 47. The microphone signals are received by control circuitry 43 for generating a send signal for transmission to wall jack unit 19. The audio information received from wall jack 19 is utilized by circuitry 43 for generation of a speaker signal along a conductor 49. The speaker signal on conductor 49 is received by mike/speaker circuitry 41 for responsively driving loudspeaker 29.

Control circuitry 43 may be constructed utilizing the circuitry of the preferred embodiment described in the cited related application. Specifically, substitution may be made in FIG. 3A of the related application for its microphones 11, microphone interface/gating circuitry 353, power amp 321, and loudspeaker 13 by the present application's microphone/loudspeaker unit 11. The gated microphone signal may be applied to the related application's conductor 358 and the non-gated signal to its conductor 1003. The speaker signal may be taken from the output of the related application's mixer/limiter stage 334. As will suggest itself, other types of control circuitry can be used as circuitry 43 in order to transmit microphone signals and receive loudspeaker signals along a telephone line or other telecommunication link.

Control circuitry 43, as described in the preferred embodiment of the subject matter of the cited Julstrom application provides suppression (attenuation) of loudspeaker level when local speech interrupts received speech by gating ON a microphone, but only to the degree necessary to reliably maintain feedback stability. When local speech is interrupted by the far end, the outgoing microphone signal will be suppressed and the loudspeaker heard at normal level. Circuitry of the cited application also determines necessary send/receive direction switching for suppression to occur in an unobtrusive, conversationally oriented manner. When both ends talk simultaneously, priority is given to the interrupting party, maintaining natural interaction. Either end can always "get through" without yelling.

The combined gated microphone signal from all gated ON microphones is fed along conductor 45 to the control circuitry 43 of unit 15. The gated microphone signal may be passed, for example, through a current control amplifier (as in the cited application) prior to entry into a conventional hybrid circuit for placing the microphone signal onto the telephone line via jack 19. As described in the cited Julstrom application, the control current input to the current controlled amplifier is governed by a send/receive direction decision. Potential feedback loop gain instabilities are controlled by inserting suppression in the send path during the receive mode and in the receive path during the send mode.

A number of circuits presently on the market also may be utilized as control circuitry 43 in order to transmit the gated microphone signal to telephone jack 19 for transmission to the far end of the telecommunication link and to extract the receive signal from the telephone jack 19 for transmission to the loudspeaker 29. The mike/speaker circuitry 41 utilizes a different gating structure than that disclosed in the cited Julstrom application. This will become evident as circuitry 41 is described hereinafter.

Figure 5:
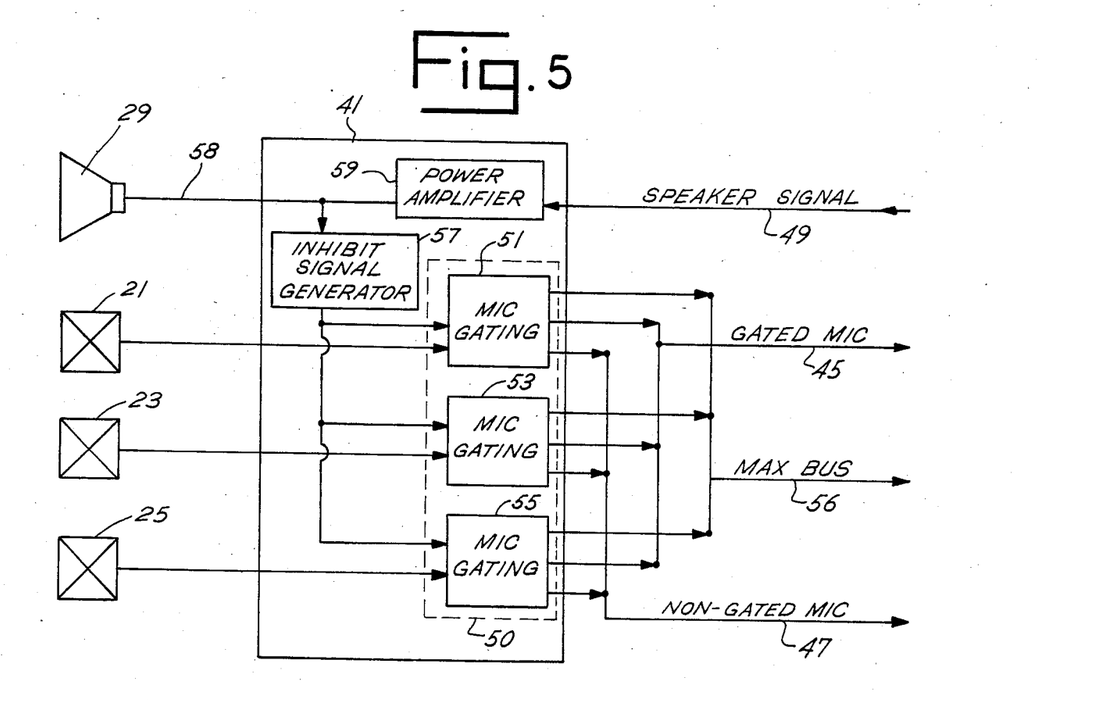
FIG. 5 is a block diagram of the microphone speaker circuitry of the circuitry of FIG. 4.

Referring to FIG. 5, mike/speaker circuitry 41 includes gating circuitry 50 comprised of three like mike gating circuits 51, 53, 55, associated with a respective microphone 21, 23, 25. A conventional power amplifier 59 responds to the speaker signal from control circuitry 43 appearing on conductor 49 and generates a similar signal on a conductor 58 of sufficient power level to drive loudspeaker 29. An inhibit signal generates 57 receives the loudspeaker drive signal along conductor 58 and responsively generates an inhibit signal to each gating circuit 51-55. Each gating circuit 51-55 is alike in structure and one will be described with reference to FIGS. 6 through 12. A MAX bus conductor 56 interconnects the mike gating circuits, but need not connect to control circuitry 43, as described hereinafter with reference to FIGS. 6 and 11.

Figure 6:
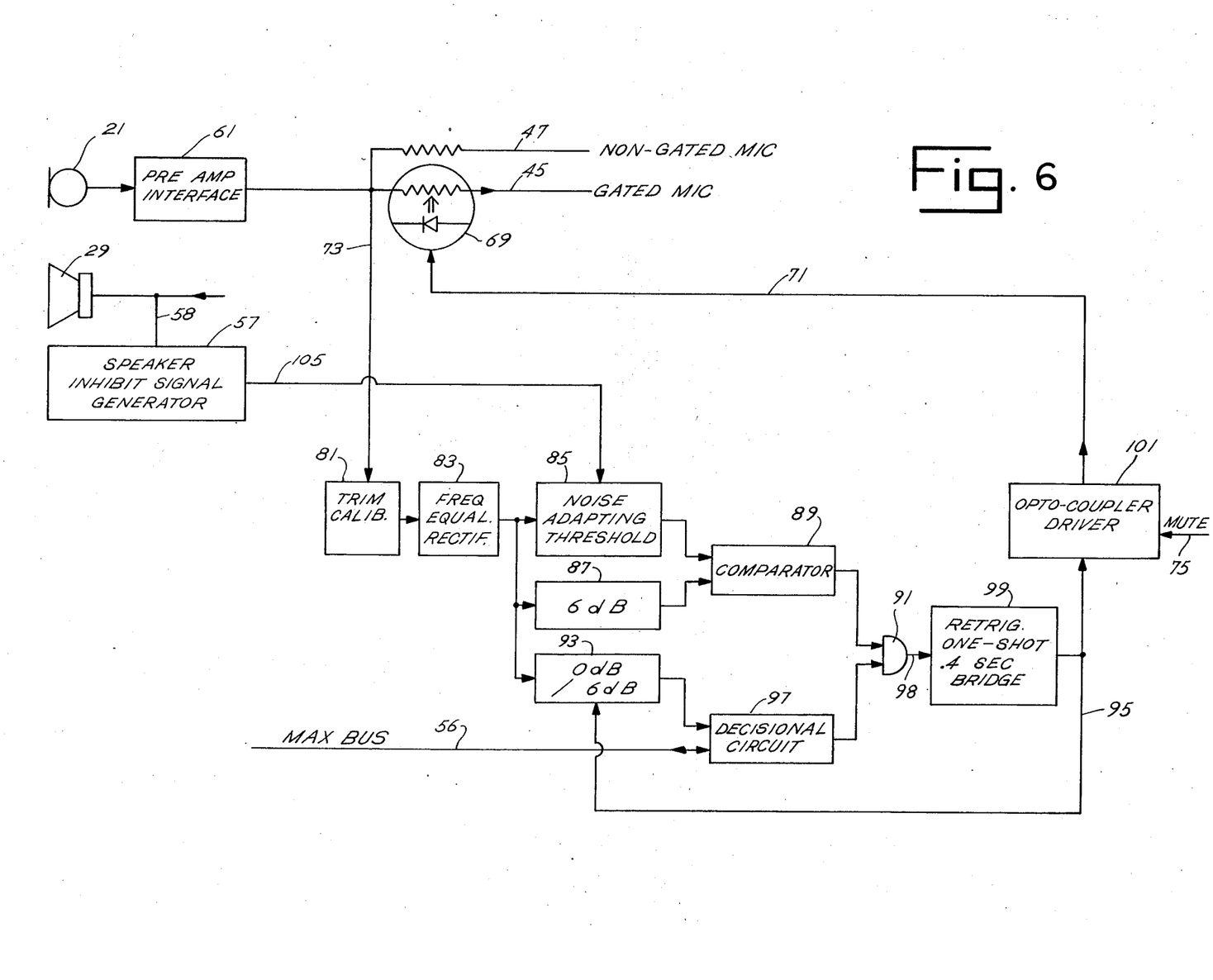
FIG. 6 is a block diagram of the microphone gating circuitry of the circuitry of FIG. 5.

Referring to FIG. 6, microphone 21 is electrically connected to a preamplifier/interface circuit 61. After preamplification, the microphone signal is output as a nongated microphone signal along conductor 47 and gated through an opto coupler switch 69 for output as a gated microphone signal along conductor 45.

The remaining circuitry of FIG. 6 controls the gating of opto coupler switch 69 by generation of an opto coupler control signal along a conductor 71 to the opto coupler switch. The signal on conductor 71 is developed in accordance with (1) the preamplified microphone signal of its associated microphone (appearing on a conductor 73), (2) a signal related to the other microphones (appearing on MAX bus 56) (3) the loudspeaker drive signal (appearing on conductor 58) and (4) a mute logic signal (appearing on conductor 75).

The microphone signal on conductor 73 enters a trim calibration circuit 81. Circuit 81 is utilized to calibrate its associated mike gating circuit 51 (FIG. 5) so that each of the three mike/gating circuits 51-55 functions identically in its comparison analysis, as will be understood.

The microphone signal is then fed to a frequency equalization/rectification circuit 83 which frequency equalizes the audio signal. Low frequencies, and to a lesser extent high frequencies, are reduced in level relative to mid frequencies. Circuitry 83 also serves to precision full wave rectify the audio signal and filter the resultant. The output of circuitry 83 is a varying DC voltage level signal which carries information of the amplitude and time of occurrence of speech as well as noise in the room as picked up by the associated microphone 21.

The output of circuitry 83 is fed to a noise adapting threshold circuit 85 which generates a threshold voltage level representative of room noise in the vicinity of the microphone 21. Circuitry 85 generates the threshold voltage level by effectively following the DC microphone signal using a very slow attack and immediate decay following. As the DC microphone level signal increases, a capacitor is slowly charged over a long RC time constant, and then as the DC microphone level signal is removed, the capacitor is quickly discharged at the same rate as the DC microphone level signal decrease. Because of the patterns of ordinary speech, the resulting voltage appearing on the capacitor is representative of noise in the room The noise adaptive threshold voltage will adapt to steady background room noise which does not go below a certain level. Normal speech will not significantly charge the capacitor, which will continually discharge to the background noise level during even very brief pauses in speech.

The DC microphone output of circuitry 83 is also fed to an attenuator circuit 87 where the DC microphone signal is attenuated by 6 dB (a factor of 2). The output of attenuator circuit 87 and the output of noise threshold circuit 85 are fed to a voltage comparator 89. Comparator 89 generates an output signal indicating when the rapidly fluctuating speech exceeds by 6 dB the threshold level representative of continuous noise in the room. Thus, the output of comparator 89 represents an independent decision with respect to one microphone that speech is occurring.

As understood, each microphone gating circuit 51, 53, 55 (FIG. 5) will make a similar decision at its respective comparator 89 as speech from a single talker reaches each of the microphones 21, 23, 25. Since it is desired to limit the number of microphones gated ON for a single sound source, the output of comparator 89 is ANDed at 91 with a second decision signal for determining whether the associated microphone should be gated ON via opto coupler 69.

The second decisional process determines which of the microphones has received the loudest speech first. The MAX bus 56 receives inputs representative of the other microphone signals for use in the second decisional process. The MAX bus is connected to a decisional circuit 97 where the other microphone signals will be compared to the signal of the associated microphone 21.

The DC microphone signal from circuitry 83 is first attenuated by a 6 dB attenuator 93 prior to input to decisional circuit 97. Attenuator 93, however, is electrically actuable along a conductor 95 for removing the 6 dB attenuation when the microphone is gated ON. The output of the defeatable 6 dB attenuator 93 is connected to decisional circuitry 97 which compares it to the comparable signals in the other microphone circuits by way of the MAX bus interconnection for determining whether it is momentarily the maximum of all such comparable signals. The signal level on MAX bus 56 is controlled by decisional circuitry 97 and the comparable circuits associated with the other microphones to be equal to such maximum.

When both the noise adapting threshold criteria is satisfied (i.e., speech is occurring) and the MAX bus criteria is satisfied (i.e., the associated microphone 21 is momentarily receiving the loudest speech as slightly modified by the defeatable 6 dB attenuation of each microphone circuit), an output trigger signal is generated along a conductor 98 for actuating a retriggerable one shot 99. The output of one shot 99 actuates an opto coupler driver 101 which in turn drives opto coupler switch 69, gating the microphone signal of the associated microphone onto conductor 45. One shot 99 provides a 0.4 second hold time after each trigger on its input conductor 98. The output of one shot 99 is fed back to the control input of defeatable 6 dB attenuator 93 along conductor 95. Attenuator 93 responds to the HIGH signal from one shot 99, and removes the 6 dB attenuation.

The net result of the MAX bus interaction, as described above, is that a single talker gates on only one microphone, but a plurality of talkers speaking normally can reliably gate ON a plurality of microphones.

The loudspeaker 29, of course, will present speech signals to each of the microphones 21-25. In order to prevent gating of the microphone channels by speech from the loudspeaker, a speaker inhibit signal generator 57 is utilized. Generator 57 receives the loudspeaker drive signal 58 for responsively generating a speaker inhibit signal along a conductor 105. Generator 57 frequency equalizes, rectifies, and filters the loudspeaker driving signal for generating a DC output onto conductor 105. The speaker inhibit signal appearing on conductor 105 feeds each of the mike/gating circuits 51-55.

The speaker inhibit signal is fed to the noise adapting threshold circuit 85 for affecting the noise threshold level in the manner described above and hereinafter with reference to FIG. 10. Microphone gating for loudspeaker sound and its reverberant decay is prevented with minimal inhibition of desired microphone gating for local speech.

As will suggest itself, when two or more microphone/speaker units 11 are connected in tandem along the top of a conference table, all MAX buses are connected together, all loudspeaker power amplifier inputs are connected together for being driven by the speaker signal from control unit 15, and all gated microphone outputs 45 are connected together as are all nongated outputs 47.

Mute input 75 can be actuated by appropriate logic circuitry to defeat individual microphone gating without altering the MAX bus interactions, yielding the results described above.

Figure 7:
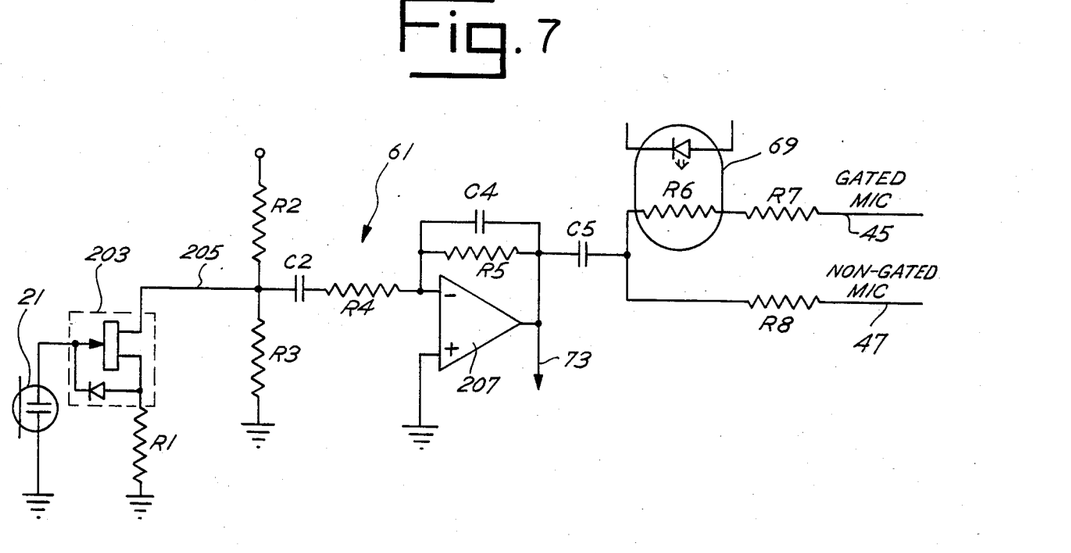
FIGS. 7–13 are schematic diagrams of the microphone gating circuitry of FIG. 6.

It will be understood with reference to FIGS. 7-13 that all op amps and comparators are connected to well regulated and filtered, balanced voltage supplies of ±15 volts, as is well known in the art. Referring to FIG. 7, microphone 21 is of the electret condenser type. The transducer is interconnected to preamp/interface circuitry 61, including a field effect transistor impedance converter 203 (Sanyo 25K156L), transducer calibration resistor R1 and bias resistors R2, R3, preamplifier components R4, R5, C2, C4 and operational amplifier 207, connected as shown. Resistor R1 is selected to assure uniform sensitivity of each transducer, impedance converter, R1 assembly. Resistor R5 sets the gain of the preamp and is a precision resistor so that identical acoustical sensitivities from each microphone will be presented to the audio mixing buses and to calibration circuit 81. Resistors R7 and R8 are also precision resistors.

The microphone signal passes through capacitor C5, photoresistor R6 (part of opto coupler 69), resistor R7, and onto gated microphone conductor 45. The microphone signal is also passed through capacitor C5 and resistor R8 onto nongated microphone conductor 47. The microphone signal is also transmitted along a conductor 73 to the trim calibration circuit 81, described in detail with reference to FIG. 8. The gated and nongated buses 45, 47 are terminated with resistors to ground, 5.6 k, 1.0 k respectively, preferentially located in control circuitry 43 so that the values will not change as a plurality of units 11 are linked. These terminations assure that background noise and reverberation pickup remain substantially constant as the number of units 11 used varies and as the number of gated ON Microphones varies above 0. This method was described in Anderson et al. and discussed in the referenced article.

Figure 8:
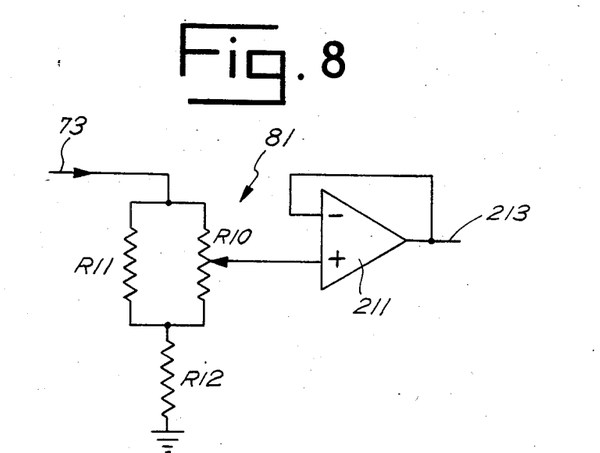

Referring to FIG. 8, the microphone signal enters trim calibration circuit 81 along conductor 73. Calibration circuit 81 includes an operational amplifier 211, trim resistor R10, and resistors R11, R12 connected as shown. Calibration circuit 81 is used to trim out component tolerance errors to give identical microphone input to MAX bus gains. In combination with the trimming of resistor R1 and the use of high quality electret transducers, the gating coverage areas of each microphone can be precisely matched and controlled.

Figure 9:
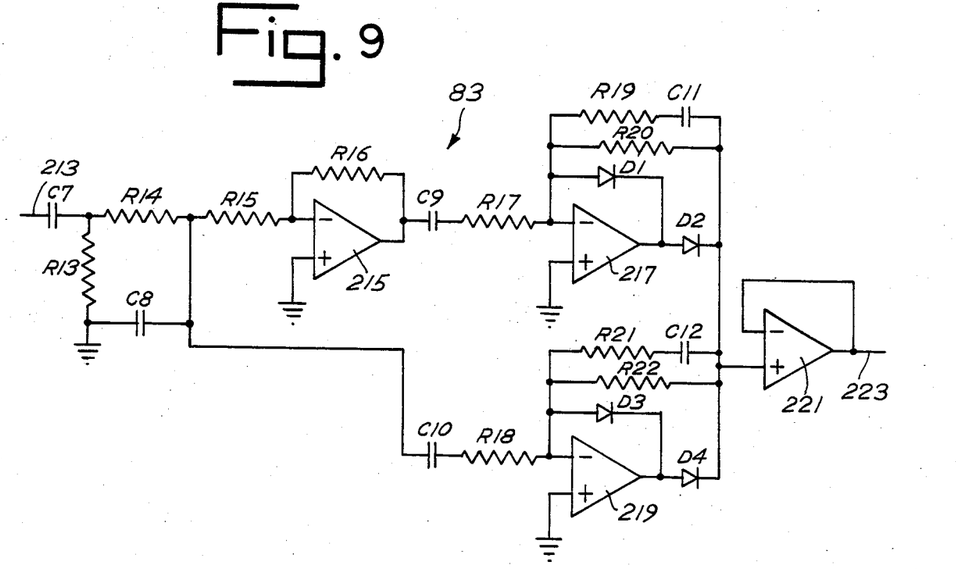

Referring to FIG. 9, frequency equalizer/rectifier circuit 83 receives the microphone signal from circuit 81 along conductor 213. Circuit 83 emphasizes the speech portion of the frequency spectrum and attenuates very high frequencies somewhat and low frequencies which lie outside of the speech band considerably. Also, since there is less energy in the high frequency parts of the speech band, for example, "s" sounds, as compared to the energy in the low frequency parts of speech, equalizer/rectifier circuit 83 serves to emphasize the high frequency portions within the frequency band of speech. Overall, this greatly reduces the interfering effects of room noise on gating and enables rapid filter time constants to be used.

Circuitry 83 includes an operational amplifier 215, resistors R13-R18 and capacitors C7-C10, connected as shown. Circuitry 83 further includes a pair of operational amplifiers 217, 219 interconnected with diodes D1-D4, resistors R19-R22 and capacitors C11, C12, connected as shown, for precision full wave rectifying and filtering of the microphone signal. Attack and decay filter time constants are equal at 11 msec. Circuitry 83 provides accurate level sensing over a wide dynamic range, particularly with speech sounds. An operational amplifier 221 buffers the output of equalizer/rectifier circuit 83, appearing on conductor 223.

Figure 10:
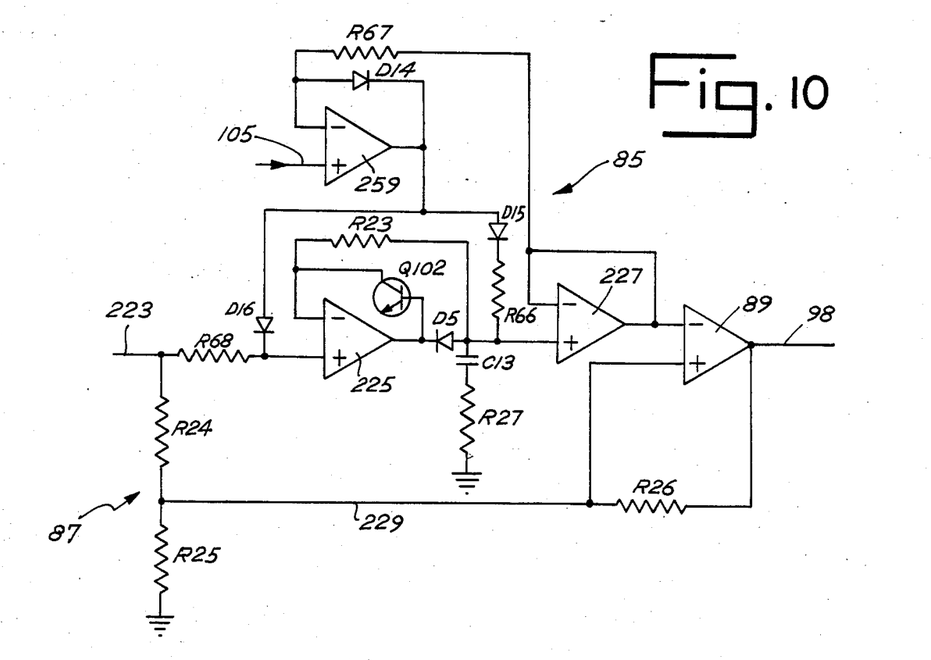

Referring to FIG. 10, noise adapting threshold circuit 85 is illustrated in more detail. The signal appearing on conductor 223 is a linear amplitude representation of the frequency equalized microphone signal. This amplitude representation is compared with a voltage appearing on a capacitor C13 which represents room noise. The signal appearing on conductor 223 is applied to the noninverting input of a field effect transistor input operational amplifier 225 through resistor R68. As the signal at the noninverting input changes, capacitor C13 is charged and discharged accordingly. Resistor R27 is of a low value which is used to aid the stability of operational amplifier 225 and may be neglected in the circuit analysis. Transistor Q102 is interconnected between the output and the inverting input of operational amplifier 225 and is used as a low leakage current diode.

When the noninverting input of op amp 225 is higher in voltage than the capacitor voltage, then op amp 225 holds its inverting input at the same voltage as its noninverting input through transistor Q102. Resistor R23 charges capacitor C13 slowly with a 10 second time constant. When the signal on the noninverting input of the operational amplifier attempts to go lower than the voltage on the capacitor, then op amp 225 discharges capacitor C13 through diode D5. The operational amplifier pulls down at an appropriate rate in accordance with the feedback voltage appearing at the inverting input through resistor R23, which has a negligible voltage drop across it due to the low input current of op amp 225 and the low leakage current of Q102. This makes discharge diode D5 appear as a precision diode.

Thus, the noise adaptive threshold voltage on capacitor C13 tracks the voltage on conductor 223 with a slow attack, immediate decay characteristic, seeking the lowest continuous background level.

The threshold voltage appearing on capacitor C13 is buffered by a unity gain field effect transistor input operational amplifier 227. The output of operational amplifier 227 provides a signal representative of room noise.

As shown in FIG. 10 6 dB attenuator 87 is constructed by resistors R24, R25 which provide along conductor 229 a 6 dB modification of the input signal appearing on conductor 223. Comparator 89, which is formed from an open collector output LM339, receives the buffered output of the threshold voltage at its inverting input and receives the 6 dB attenuated signal at its noninverting input. A resistor R26 provides a small amount of hysteresis around comparator 89 for switching stability. Thus, the output of comparator 89 potentially provides a logic high signal along a conductor 98 indicating that speech is occurring at its associated microphone 21. The voltage level on conductor 98 is also dependent on decisional circuit 97 (FIG. 6) to be described with reference to FIG. 11.

Figure 11:
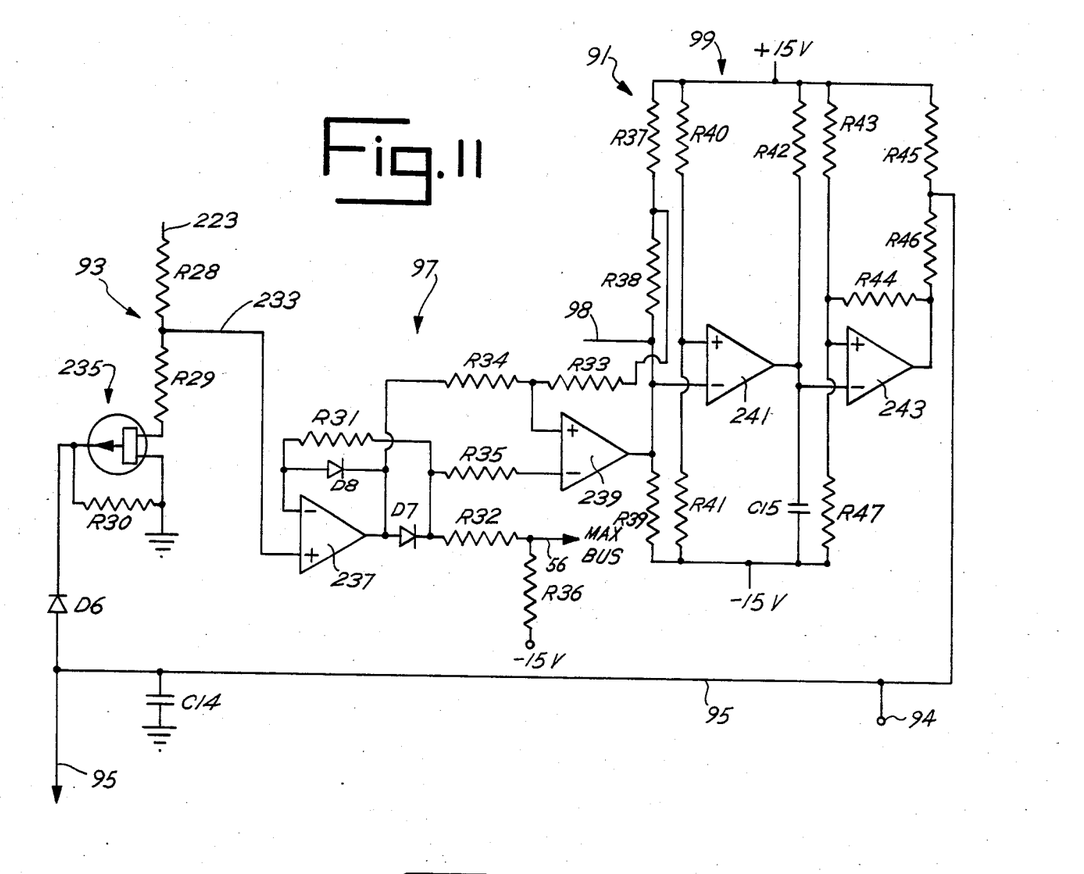

Referring to FIG. 11, 6 dB attenuator 93 is constructed by resistors R28, R29 which provide along a conductor 233 a 6 dB attenuation of the input signal appearing on conductor 223. A field effect transistor switch 235 (p-channel, Vp<3 volts) is connected between resistor R29 and ground for effectively removing the 6 dB attenuation when the FET switch 235 is turned off. Turning off of FET 235 effectively removes resistor R29 from the circuit.

A signal appearing on conductor 95 passes through diode D6 for turning FET switch 235 OFF. A resistor R30 is connected between ground and the cathode of diode D6 as shown, and a capacitor C14 connects conductor 95 to ground. Resistor R30 and diode D6 help to provide proper control voltages to the gate of FET 235. Capacitor C14 slightly slows the voltage transition on conductor 95 to minimize capacitively coupled noise spikes to the defeatable 6 dB attenuator 93 and other parts of the circuitry.

Decisional circuitry 97 includes an op amp 237 having its noninverting input connected to receive the output of attenuator 93 along conductor 233. The inverting input of op amp 237 is connected to the MAX bus via resistors R31 and R32. Resistor R32 is of a low value and aids circuit stability. If the noninverting input of op amp 237 attempts to go higher than the amplitude of the MAX bus, diode D7 is forward biased and will "hold up" the MAX bus to a level equal to the non-inverting input level. If the noninverting input of op amp 237 is lower than the voltage on the MAX bus, diode D7 is reverse biased. Diode D8 prevents excessive negative voltage excursions at the output of op amp 237. The bias condition of diode D7 is monitored by a comparator 239 (LM339), potentially providing a logic high indication at its output along conductor 98 only when diode D7 is forware biased. Resistor R33 provides hysteresis for stabilizing comparator 239. Resistors R34, R35 are connected as shown. At least one resistor R36 should be included to guarantee a load under all conditions for the diode D7 which is holding up the MAX bus, and thus enable reliable forward bias sensing by comparator 239.

The output of comparator 89 (FIG. 10) is connected to conductor 98 (FIG. 11). Comparator 89 and comparator 239 thus serve to provide a hard wired AND (shown symbolically as 91 in FIG. 6) along conductor 98 because of their open collector configuration. Thus, only when both the noise adapting threshold criteria and the MAX bus criteria are satisfied, then retriggerable one shot 99 will be actuated.

Retriggerable one shot 99 includes an open collector output comparator 241 (LM339) interconnected to resistors R37-R41, as shown. Comparator 241 responds to a logic HIGH input on its inverting input which serves to discharge a capacitor C15. A comparator 243, (LM339) interconnected to resistors R42-R47, monitors the voltage across capacitor C15 for generating a logic output onto conductor 95. Capacitor C15, comparator 243, and associated components provide a 0.4 second hold time for the output signal appearing on conductor 95. This 0.4 second time bridges gaps in triggering, as previously described. When triggering stops, capacitor C15 begins to charge back up, taking 0.4 second before capacitor C15 reaches a sufficient voltage to change the output of comparator 243. If triggering recurs before the 0.4 seconds is finished, the capacitor C15 is again discharged and the signal on conductor 95 does not change.

Figure 12:
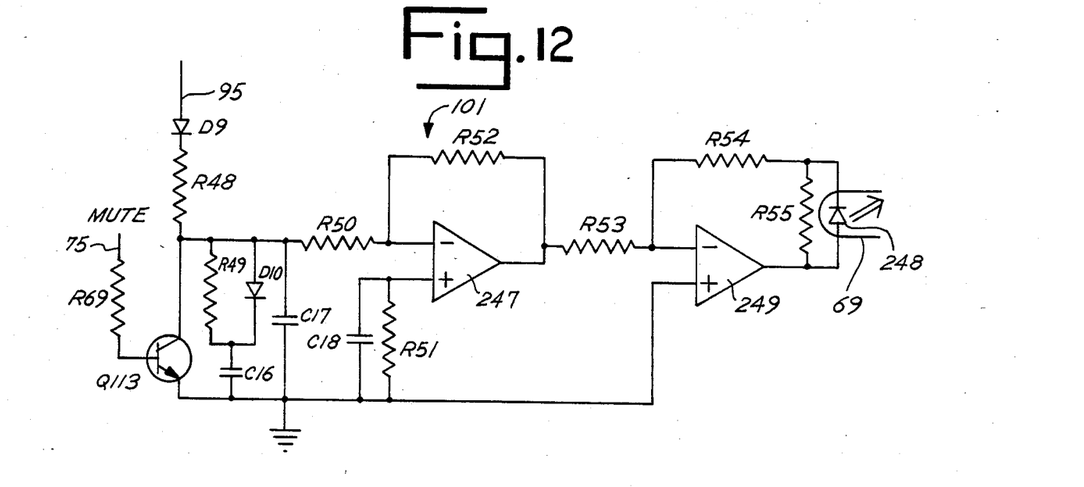

The output of retriggerable one shot 99, which appears on conductor 95 is fed to opto coupler driver 101, as shown in FIG. 12. Driver 101 is used to provide a controlled attack and decay time to the opto coupler LED 248 and thus to the resistance change of photoresistor R6 (FIG. 7). The driver is comprised of op amps 247, 249, diodes D9, D10, capacitors C16-C18 and resistors R48-R55, connected as shown. The result is that the audio signal is gated with a 4 msec. attack time and a 0.3 sec. decay time, yielding a click-free, unobtrusive switching action.

A mute circuitry comprised of resistor R69 and transistor Q113 serves to prevent the microphone gating signal without effecting the gating control circuitries 85, 87, 89, 93, 97, 99 (FIG. 6). Transistor Q113 has its collector and emitter connected across the input to LED driver 101 and ground for shorting the input to ground during muting. Resistor R48 isolates the shorting signal from the other gate control circuitry. Appropriate logic circuitry (not shown) may be used to apply a positive voltage to conductor 75, thus turning on Q113 and activating muting. This particular type of muting permits construction of dead zones as previously described.

Figure 13:
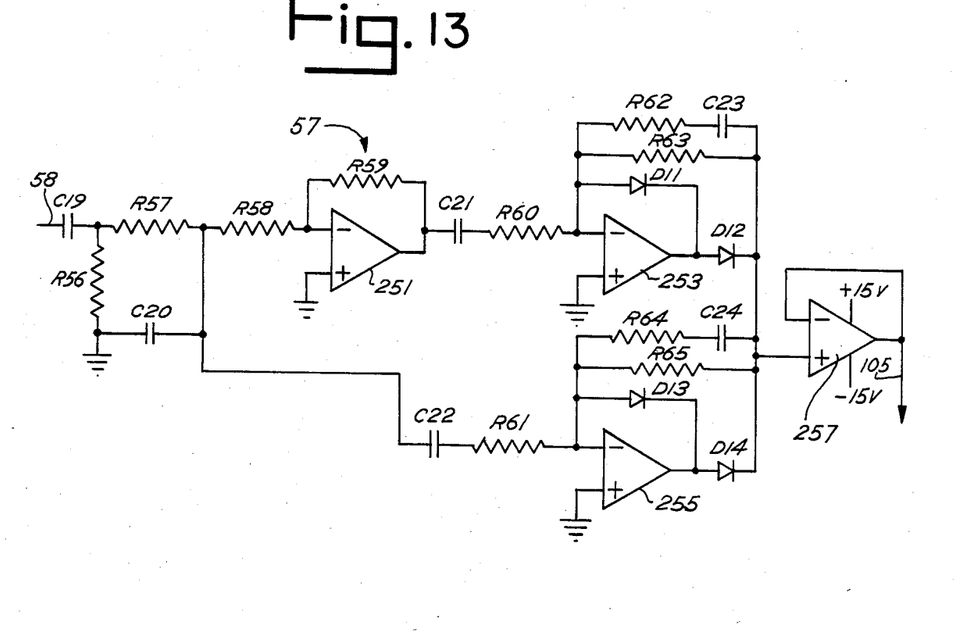

Referring to FIG. 13, speaker inhibit signal generator 57 (FIG. 6) samples the loudspeaker drive signal along conductor 58. The inhibit generator generates a speaker inhibit signal along its output conductor 105. Generator 57 serves to frequency equalize, rectify and filter the loudspeaker driving signal for generating a DC output signal onto conductor 105. The DC output signal is representative of the amplitude level of speech from the loudspeaker. The frequency equalization and filter parameters are substantially identical to those of the similar circuit 83, but the gain is scaled appropriately for the described purpose. Inhibit signal generator 103 is formed from op amps 251, 253, 255, 257, diodes D11-D14, capacitors C19-C24 and resistors R56-R65, interconnected as shown.

Referring again to FIG. 10, the speaker inhibit signal appearing along conductor 105 (from FIG. 13) is fed to the non-inverting input of an op amp 259 for modifying the threshold voltage level appearing on capacitor C13. When the voltage level on conductor 105 is at ground (0 volts), or is less than the voltage on capacitor C13, op amp 259 and associated components do not effect NAT circuit 85 operation. Diode D14 prevents excessive negative voltage excursions on the output of op amp 259 which would otherwise occur due to positive voltage on capacitor C13 feeding back to the inverting input of op amp 259 through buffer op amp 227 and resistor R67. When the voltage level on conductor 105 attempts to exceed the voltage on capacitor C13, then op amp 259 charges capacitor C13 via diode D15 and resistor R66 to maintain the two voltages equal.

The signal at the output of op amp 259 is also fed to the noninverting input of op amp 255 via diode D16 in order to override the otherwise present input voltage during the time when the speaker inhibit signal controls the voltage on capacitor C13 to prevent contention for the voltage level appearing across capacitor C13. The immediate positive change on the voltage of capacitor C13, as caused by the speaker inhibit signal, would normally cause op amp 255 to pull in the opposite direction through diode D5. By providing the inhibit signal to the noninverting input of op amp 255 at a slightly higher voltage level than on capacitor C13, this problem is avoided. This slight voltage difference is assured by resistor R66 and the higher current level in diode D15 relative to diode D16. As the speaker inhibit signal on conductor 105 decreases from its peak level, capacitor C13 is discharged exactly in step by op amp 225 through diode D5, controlled by omp amp 259 through diode D16.

The voltage on capacitor C13 and the output of buffer op amp 227 track exactly the voltage level and rapid attack and decay times of the speaker inhibit signal on conductor 105 until it drops below the microphone level representation on conductor 223, at which point normal NAT action resumes. At this time, the microphone signal will probably represent the reverberant decay of the loudspeaker sound, which the voltage on capacitor C13 will follow, as desired.

The following circuit values are given:

| Resistors | Resistance |
| --- | --- |
| R2, R46 | 8.2K |
| R3 | 9.1K |
| R4, R27 | 200 |
| R5 | 470K |
| R7 | 5.1K |
| R8, R11 | 11K |

-continued

| | |
|---|---|
| R31, R67, R50, R51, R52 R48 | 100K |
| R12, R55, R40 | 30K |
| R13, R56 | 2.7K |
| R14, R57 | 1K |
| R15, R16, R20, R22, R47, R58, R59 | 51K |
| R17, R18, R60, R61 | 510 |
| R19, R21, R32, R66, R62, R64 | 100 |
| R24, R25, R45, R69 | 10K |
| R23, R44 | 2.2 M |
| R26, R49, R42 | 1.5 M |
| R28, R29, R34, R35, R68 | 20K |
| R30, R33, R36 | 1 M |
| R37, R38 | 15K |
| R39 | 1.5K |
| R41 | 750 |
| R43 | 27K |
| R53 | 680 |
| R54 | 390 |
| R63, R65 | 24K |
| R1 | Nominally 1.2K |
| R10 | 100K Trimpot |
| R6 | Photocell ON resistance 500 Photocell OFF resistance 10 M |

| Capacitors | Capacitance |
|---|---|
| C2 | .33 |
| C4 | 10 P |
| C5, C13 | 4.7 |
| C7, C9, C10, C19, C21, C22 | .15 |
| C8, C20 | .068 |
| C11, C12, C15, C17 | .22 |
| C14 | .01 |
| C16 | .1 |
| C18 | .047 |
| C23, C24 | .47 |

Microphones may be used in separte enclosures, and directional patterns other than unidirectional may be used. A speakerphone (simple teleconference system) may be contructed with the control circuitry of the related application or other types of control circuitry using just one microphone when this is adequate. The advantage of excellent gating performance, even in the presence of incoming speech, would be maintained. Referring again to FIG. 6, defeatable attenuator 93, decisional circuit 97, AND function 91, and MAX bus 56 would not be needed for a single microphone teleconference system.

Likewise, multiple microphone pickup may be used alone without the use of a teleconference loudspeaker. Referring again to FIGS. 5 and 10, power amplifier 59, inhibit signal generator 57, and loudspeaker 29 would, of course, not be needed. Neither would op amp 259, diodes D14, 15, and 16 and resistors R66, R67, R68, with R68 being replaced by a connection.

It will also be evident that, referring again to FIG. 11, gating logic signal on conductor 95, for example, may be used to control other related functions, such as overhead loudspeaker muting, automatic video camera switching, or talker indicative lights. An output port 94 is provided to retrieve the logic signal. Accurate microphone gating coverage areas can be established with no overlap.

As a further variation, directional microphones may be used in an array spaced very close to each other. This would typically be an array of 2, 3, or 4 unidirectional (cardioid) microphones operated at identical gains facing outward in the same plane at equally spaced angles. In this case, MAX bus decisions for an individual sound source are based primarily on relative microphone amplitudes rather than relative time-of-arrival of the speech.

Figure 14:
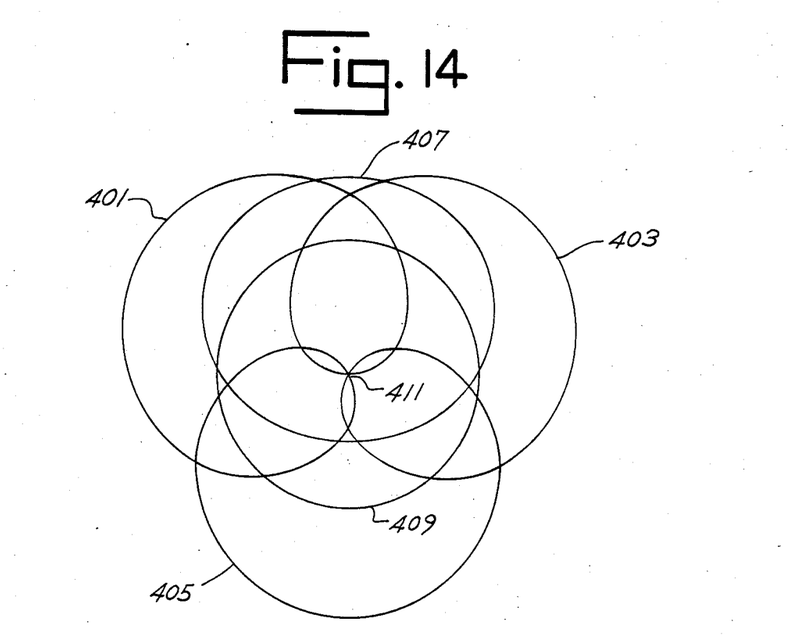
FIG. 14 is a representation of microphone directional patterns obtained with a variation of the invention.

The directional pattern in the horizontal plane for an array of three unidirectional microphones is shown in polar coordinate form in FIG. 14. Graphs 401, 403, and 405 represent, by the distance of the line from the center point 411, the relative sensitivities of the three microphones (on a linear basis, not dB) to sound sources coming from any angle around the array.

Graph 407 represents the directional pattern of the combination, or sum, of graphs 401 and 403. Similar graphs may be obtained for the sums of the other two pairs. The relative sensitivity of graph 407 is scaled to maintain the same total sensitivity as one of the single cardioid microphones to background room noise and reverberation coming equally from all directions. The directional pattern may be described as a wide-angle cardioid.

Graph 409 represents the sum of graphs 401, 403 and 405, again scaled to maintain the same sensitivity to room noise and reverberation. This directional pattern is omnidirectional. In symmetrical, two or four microphone arrays, opposite pairs of cardioids combining, or all microphones combining will also form an omnidirectional pattern. In the four microphone array, two or three adjacent microphones combining will form different wide angle cardioid patterns.

The variety of directional patterns and orientations just described will be obtained using the gating method of the present invention as varying numbers of talkers at various locations around the arrays speak in varying combinations, as understood. One or more of the microphones in an array may be muted to yield direction-sensitive gating similar to that disclosed in Anderson et al. (U.S. Pat. No. 4,489,442), but relatively less disturbed by close reflections and reverberation.

It is generally desirable in an automatic microphone gating system to maintain constant pickup of room noise and reverberation as the number of gated ON microphones varies above zero. This eliminates audible background noise "pumping" and "breathing" effects and maintains constant feedback loop gain, assuming the microphones are in the reverberant field of the loudspeaker. Ordinarily, including in the preferred embodiment teleconference system of the present invention, the microphones are spaced sufficiently far apart to assume random phase relationships in their response to room noise and reverberation. To maintain constant pickup of these sounds, the gain should be attenuated according to the following formula, which has become standard practice:

$$\text{Attenuation} = 10 \log_{10} \text{NOM}$$

where attenuation is in dB and NOM is the number of gated ON microphones. This is equal to 3 dB additional attenuation for each doubling of the NOM.

The required attenuation law is different for the closely spaced arrays. To obtain the scaling characteristic shown in FIG. 14 for the three microphone array, requires the relative attenuations:

| | |
|---|---|
| 1 mike ON | 0.00 dB |
| 2 mikes ON | −5.12 dB |
| 3 mikes ON | −8.29 dB |

To maintain constant reverberant sound pickup in the four microphone array, of which the two microphone array is a subset, requires the relative attenuations:

| | |
|---|---|
| 1 mike ON | 0.00 dB |
| 2 opposite mikes ON | −4.77 dB |
| 2 adjacent mikes ON | −5.44 dB |
| 3 mikes ON | −8.45 dB |
| 4 mikes ON | −10.79 dB |

Referring again to FIG. 7, these attenuation characteristics may be closely approximated using a similar mixing bus arrangement as already employed on gated microphone mixing bus 45. If the bus is terminated with a resistor equal to 4.0 times the sum of the photoresistor R6 ON resistance and resistor R7, then the result is the relative attenuation characteristic:

| | |
|---|---|
| 1 mike ON | −0.00 dB |
| 2 mikes ON | −5.11 dB |
| 3 mikes ON | −8.30 dB |
| 4 mikes ON | −10.63 dB |

In this case, the bus terminating resistor (not shown) would be 22K ohms rather than 5.6K ohms.

An array may be used singly or in combination with other microphones or arrays spaced away. In these instances, the bus terminated with the 22K ohm resistor is isolated locally within an array by a buffer which feeds the overall system gated microphone mix bus through another opto coupler. Associated resistor values are as originally specified for this bus. This additional opto coupler is driven on whenever any microphone in its associated array is gated on.

The above described option allows what are essentially automatically variable directional characteristic, automatically variable orientation microphones to be created and included in automatic microphone gating system. The option is obviously not limited to undirectional (cardioid) microphones nor to microphones oriented in the same plane.

It should be understood, of course, that the foregoing description refers to a preferred embodiment of the invention and that modifications or alterations may be made therein without departing from the spirit or scope of the invention as set forth in the appended claims.

What is claimed:

1. A microphone system comprising:
   a plurality of microphones, each said microphone responsive to speech for generating an electrical microphone signal carrying speech information;
   gating means receiving each said microphone signal and gating a said microphone signal to gate ON its associated microphone in response to a gating signal, said gating means including:
   monitoring means for continuously monitoring the maximum of the microphone signal amplitudes of said microphone signals at one scaled level for microphone signals associated with gated ON microphones and at a different scaled level for microphone signals associated with gated OFF microphones, said monitoring means generating an electrical MAX signal representative of said maximum, said monitoring means comparing the scaled amplitude level of each said microphone signal with said MAX signal for responsively generating a trigger signal associated with a said microphone to gate ON the associated microphone;
   gating signal generation means responsive to a said trigger signal for generating a gating signal of at least a predetermined minimal non-zero time duration for gating ON the microphone associated with said trigger signal; and
   gate means responsive to a said gating signal for gating ON an associated microphone.

2. A microphone system according to claim 1 and further including loudspeaker means for generating sound in the area of said microphones, said loudspeaker means being driven by a loudspeaker signal; and inhibit signal generator means for generating an electrical inhibit signal related to said loudspeaker signal for inhibiting said gating means from gating a said microphone in response to sound from said loudspeaker means.

3. A microphone system according to claim 1 wherein said monitoring means further includes threshold means for providing a threshold, said monitoring means comparing the amplitude of each said microphone signal with a said threshold; and
   wherein a said trigger signal is generated when a said microphone signal amplitude reaches a predetermined relationship with said threshold and a predetermined relationship with said MAX signal.

4. A microphone system according to claim 3 wherein said threshold means comprises means for generating a threshold signal level representative of room noise.

5. A microphone system according to claim 1 wherein said monitoring means further includes threshold means for generating a plurality of threshold signal levels, each representative of room noise, each of said plurality of threshold signal levels being generated in response to a microphone signal generated by a said microphone, and said monitoring means comparing the amplitude of each said microphone signal with a said threshold signal, and wherein a said trigger signal is generated when a said microphone signal reaches a predetermined relationship with a said threshold signal and a predetermined relationship with said MAX signal.

6. A microphone system according to claim 2 wherein said monitoring means further includes threshold means for providing a threshold, said monitoring means comparing the amplitude of each said microphone signal with said threshold; and wherein a said trigger signal is generated when a said microphone signal reaches a predetermined relationship with said threshold and a predetermined relationship with said MAX signal; and wherein said threshold means includes means for adjusting said threshold in response to said inhibit signal.

7. A microphone system according to claim 2 wherein said monitoring means further includes threshold means for generating a plurality of threshold signal levels, each representative of room noise, each said plurality of threshold signal levels being generated in response to a microphone signal generated by a said microphone, and said monitoring means comparing the amplitude of each said microphone signal with a said threshold signal, and wherein a said trigger signal is generated when a said microphone signal reaches a predetermined relationship with a said threshold signal and a predetermined relationship with said MAX signal; and wherein said threshold means includes means for adjusting said threshold signal levels in response to said inhibit signal.

8. A microphone system according to claim 4 wherein said threshold means receives a microphone signal and responds to its amplitude by generating a said threshold signal level in a slow attack, fast decay manner.

9. A microphone system according to claim 2 wherein each of said plurality of microphones are held in a fixed relationship relative to one another; and wherein said loudspeaker is held in a fixed relationship to said microphones.

10. A microphone system according to claim 9 wherein said microphones face outwardly from a point and are equally spaced about a circle having said point as its center; and wherein said loudspeaker is positioned facing upwardly from said point.

11. A microphone system according to claim 1 and further including output port means for providing said gating signal as an output signal.

12. A microphone system according to claim 1 wherein said gating signal generating means includes mute control means responsive to an electrical signal for muting a gated ON microphone.

13. A microphone system according to claim 2 including a plurality of loudspeakers daisy-chained together.

14. A microphone system according to claim 1 and further including automatic gain adjusting means for adjusting the gain of said gated ON microphones in accordance with the number of microphones gated ON to maintain constant total reverberant field pickup by said gated ON microphones; and wherein said microphones are widely spaced.

15. A microphone system according to claim 1 and further including automatic gain adjusting means for adjusting the gain of said gated ON microphones in accordance with the number of microphones gated ON to maintain constant total reverberant field pickup by said gated ON microphones; and wherein said microphones are closely spaced.

16. A microphone system comprising:
a plurality of microphones, each said microphone responsive to speech for generating an electrical microphone signal carrying speech information;
gating means receiving each said microphone signal and gating a said microphone signal to gate ON its associated microphone in response to a gating signal;
threshold means for generating a threshold signal level representative of room noise; comparator means for comparing the amplitude of each said microphone signal with said threshold,
said gating means for generating a gating signal when a said microphone signal reaches a predetermined relationship with said threshold signal level;
loudspeaker means for generating sound in the area of said microphones, said loudspeaker means being driven by a loudspeaker signal;
inhibit signal generator means for generating an electrical inhibit signal related to said loudspeaker signal for inhibiting said gating means from gating a said microphone in response to sound from said loudspeaker means, said inhibit signal modifying said threshold signal level for inhibiting microphone gating for direct loudspeaker sounds and said threshold signal level tracking said microphone level for inhibiting microphone gating for reverberant loudspeaker sounds.

17. A microphone system comprising:
a microphone, said microphone responsive to speech for generating an electrical microphone signal carrying speech information;
gating means receiving said microphone signal and gating said microphone signal to gate ON its associated microphone in response to a gating signal;
threshold means for generating a threshold signal level representative of room noise; comparator means for comparing the amplitude of said microphone signal with said threshold,
said gating means for generating a gating signal when said microphone signal reaches a predetermined relationship with said threshold signal level;
loudspeaker means for generating sound in the area of said microphone, said loudspeaker means being driven by a loudspeaker signal;
inhibit signal generator means for generating an electrical inhibit signal related to said loudspeaker signal for inhibiting said gating means from gating said microphone in response to sound from said loudspeaker means, said inhibit signal modifying said threshold signal level for inhibiting microphone gating for direct loudspeaker sounds and said threshold signal level tracking said microphone level for inhibiting microphone gating for reverberant loudspeaker sounds.

18. A microphone system, including:
a noise adapting threshold circuitry, said circuitry including:
(i) means for generating an amplitude signal representative of the amplitude of a microphone input signal;
(ii) capacitive means for storing charge for generating a threshold voltage level;
(iii) amplifier means responsive to said amplitude signal for charging said capacitive means;
(iv) feedback means for feeding back said threshold voltage to said amplifier for controlling charging of said capacitive means; and
(v) means for developing a signal representative of loudspeaker sound, said developing means applying said signal to said capacitive means and to said input of said amplifier means.

19. A noise adapting threshold circuit, comprising:
(i) means for generating an amplitude signal representative of the amplitude of a microphone input signal;
(ii) capacitive means for storing charge for generating a threshold voltage level;
(iii) amplifier means responsive to said amplitude signal for charging said capacitive means;
(iv) discharge means for discharging said capacitive means at a rate substantially equal to the rate of decrease of said amplitude signal;
(v) scaling means for generating a scaled representation of said amplitude signal; and
(vi) comparison means for comparing said threshold voltage level with said scaled representation of said amplitude signal.

20. A microphone system according to claim 1 wherein said monitoring means generates said trigger signal when and only when the scaled amplitude level of a microphone signal is the maximum of all scaled amplitude levels of said microphone signals.

21. A microphone system comprising:
a plurality of microphones, each said microphone responsive to speech for generating an electrical microphone signal carrying speech information;

gating means receiving each said microphone signal and gating a said microphone sigal to gate ON its associated microphone in response to a gating signal, said gating means including:

monitoring circuitry for providing and continuously monitoring signals reppresentative of the microphone signal amplitudes of said microphone signals for generating an electrical MAX signal having an amplitude which serves as a threshold representative of a maximum microphone signal amplitude, said monitoring circuitry comparing signals representative of the amplitude level of each said microphone signal with said MAX signal for responsively generating a trigger signal associated with a said microphone to gate ON the associated microphone;

gating signal generation means responsive to a said trigger signal for generating a gating signal of at least a predetermined minimal non-zero time duration for gating ON the microphone associated with said trigger signal; and gate means responsive to a said gating signal for gating ON an associated microphone.

* * * * *